(12) United States Patent
Fritz et al.

(10) Patent No.: US 6,210,623 B1
(45) Date of Patent: *Apr. 3, 2001

(54) METHOD FOR BLOW DOWN HYDROFORMING SHEET MATERIAL

(75) Inventors: Michael L. Fritz, Phoenic; Alton L. Fritz, Peoria, both of AZ (US)

(73) Assignee: Hy-Tech Worldwide, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,035

(22) Filed: Aug. 2, 1999

Related U.S. Application Data

(60) Continuation of application No. 08/833,716, filed on Apr. 9, 1997, now Pat. No. 5,932,167, which is a division of application No. 08/545,970, filed on Oct. 20, 1995, now Pat. No. 5,679,388, which is a continuation of application No. 08/105,033, filed on Aug. 11, 1993, now Pat. No. 5,460,773.

(51) Int. Cl.[7] .................................................. B29C 43/02
(52) U.S. Cl. ....................... 264/544; 264/552; 264/570; 425/387.1
(58) Field of Search .................................. 264/510, 512, 264/541, 552, 570, 544; 425/387.1, 390, 389

(56) References Cited

U.S. PATENT DOCUMENTS

| | | |
|---|---|---|
| 1,854,498 | 4/1932 | Anderson . |
| 3,007,206 | 11/1961 | Griswold ................................ 18/56 |
| 3,172,153 | 3/1965 | Loomis et al. ........................... 18/5 |
| 3,535,740 | 10/1970 | Frawde ................................... 18/19 |
| 3,545,241 | 12/1970 | Grankowskil et al. ................... 72/63 |
| 3,657,044 | 4/1972 | Singer ................................. 156/212 |
| 3,746,497 | 7/1973 | Neil ..................................... 425/398 |
| 3,956,452 | 5/1976 | Saito ..................................... 264/89 |
| 3,982,877 | 9/1976 | Wyeth et al. ........................... 425/503 |
| 4,080,139 | 3/1978 | Hellgren ................................ 425/389 |
| 4,105,388 | 8/1978 | Hellgren ................................ 425/389 |
| 4,128,375 | 12/1978 | Schubart ........................... 425/405 H |
| 4,133,626 | 1/1979 | Schubart ........................... 425/405 H |
| 4,283,242 | 8/1981 | Regler et al. .......................... 156/154 |
| 4,381,278 | 4/1983 | Ingraffee ............................... 264/512 |
| 4,487,730 | 12/1984 | Larribe ................................. 264/40.1 |
| 4,588,368 | 5/1986 | Buhler et al. .......................... 425/546 |
| 4,658,618 | 4/1987 | Hellgren .................................. 72/63 |
| 4,715,923 | 12/1987 | Knoll ................................. 156/380.9 |
| 4,873,044 | 10/1989 | Epel ..................................... 264/257 |
| 4,886,442 | 12/1989 | McCowin et al. ..................... 425/388 |
| 5,108,530 | 4/1992 | Niebling ............................... 156/245 |
| 5,108,532 | 4/1992 | Thein et al. ........................... 156/285 |
| 5,460,773 | * 10/1995 | Fritz et al. ............................ 264/544 |
| 5,529,654 | 6/1996 | Kavanagh et al. .................... 156/229 |
| 5,932,167 | * 8/1999 | Fritz et al. ............................ 264/544 |

FOREIGN PATENT DOCUMENTS

| | | |
|---|---|---|
| 2462984 | 2/1981 | (FR) . |
| 550507 | 1/1943 | (GB) . |
| 2060470 | 5/1981 | (GB) . |
| 45-25373 | 8/1970 | (JP) . |

* cited by examiner

*Primary Examiner*—Jan H. Silbaugh
*Assistant Examiner*—Suzanne E McDowell
(74) *Attorney, Agent, or Firm*—Cahill, Sutton & Thomas P.L.C.

(57) ABSTRACT

A method for blow down hydroforming sheet material includes hydraulically inflating a seal intermediate a pair of wall members and disposed between a platen and a table in circumscribing relationship with a cavity formed in the platen to seal the cavity and injecting gas into the cavity to urge conformance of the sheet material with a mold placed upon the table.

10 Claims, 1 Drawing Sheet

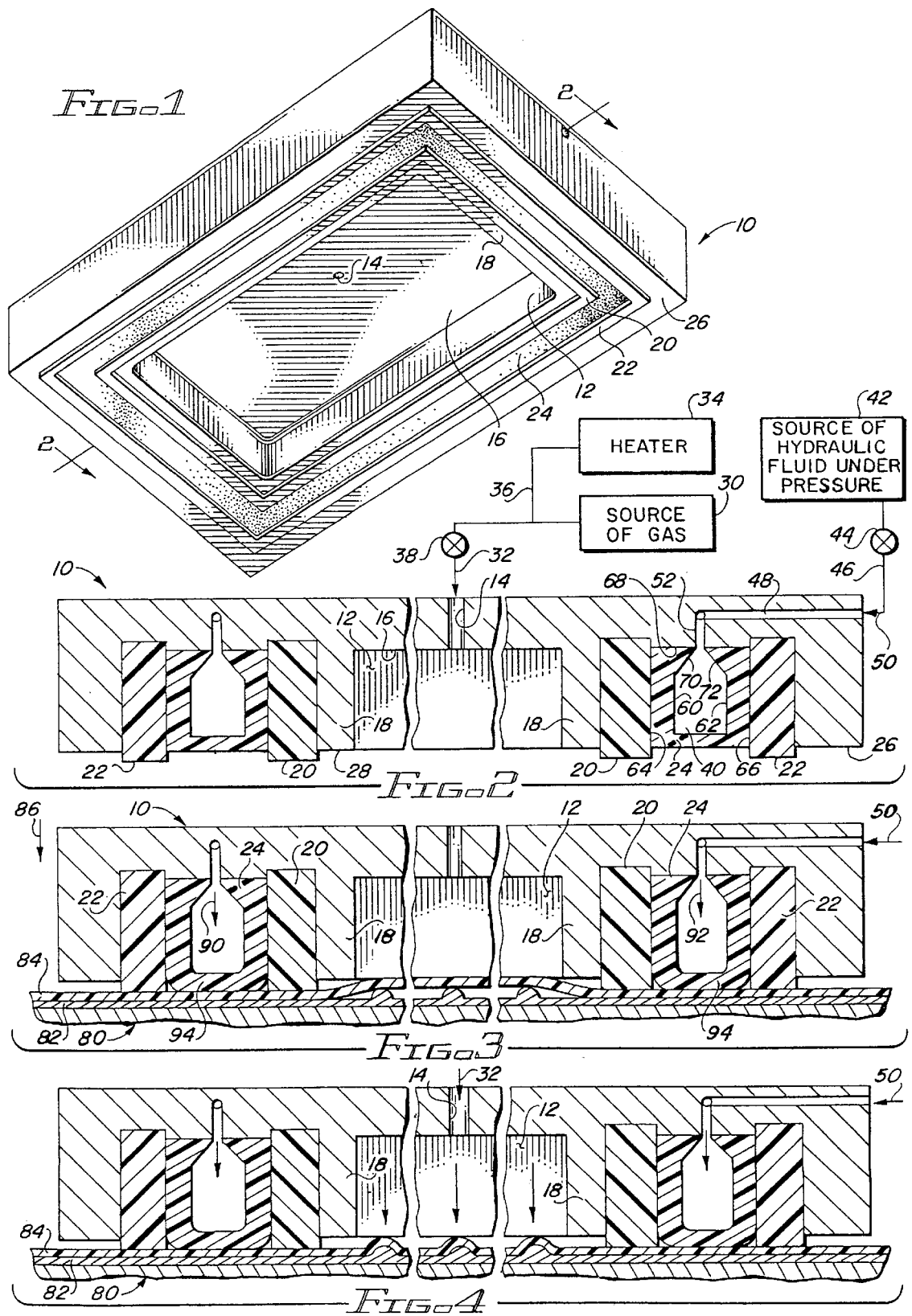

METHOD FOR BLOW DOWN HYDROFORMING SHEET MATERIAL

This is a continuation of application Ser. No. 08/833,716, filed Apr. 9, 1997, entitled "METHOD FOR BLOW DOWN HYDROFORMING SHEET MATERIAL", to be issued on Aug. 3, 1999 as U.S. Pat. No. 5,932,167; which application is a divisional of application Ser. No. 08/545,970, filed Oct. 20, 1995, now U.S. Pat. No. 5,679,388, entitled "PROTECTED SEAL FOR BLOW DOWN PLATEN"; which application is a continuation of Ser. No. 08/105,033, filed Aug. 11, 1993, now U.S. Pat. No. 5,460,773, which applications describe inventions by the present inventors.

BACKGROUND OF THE INVENTION

1. Field of the Invention

The present invention relates to platens for hydroforming finished plastic sheet material and, more particularly, to a seal used with a blow down platen.

2. Description of Related Art

The process of hydroforming has been practiced for many years. It includes the use of a flexible diaphragm disposed in a cavity of a platen for forcing sheet material to conform with the configuration of a mold. Hydraulic fluid, acting upon the diaphragm, causes the diaphragm to force the sheet material disposed intermediate the diaphragm and the mold to conform with the mold. Because substantial pressures, sometimes exceeding 5,000 psi, may be present, leakage of the hydraulic fluid about the edges of the diaphragm and onto to mold or sheet material to be formed may occur. In hydroforming operations involving a subsequent step in fabricating a product, cleaning is the norm and leakage of hydraulic fluid onto the product molded is of minor concern. When the product molded is to be a finished product, contamination of the product by leaking hydraulic fluid creates a significant problem of requiring an additional cleaning step and possibly compromising the product. To avoid the use of hydraulic fluid and the possibility of contamination of a molded product resulting from leakage of the hydraulic fluid, a hydroforming process known as a "blow down" process has been developed. In this process, the platen includes a cavity conforming in size and configuration with the mold and the sheet material to be molded. After the platen is placed against the table surrounding the mold to close the cavity, a source of high pressure air or gas is channeled into the cavity to create a high pressure environment within the cavity. The high pressure forces the sheet material to be formed against the mold and into conformance with the mold.

The pressure in the cavity of the platen may be maintained by a tight metal to metal fit between the surface of the platen circumscribing the cavity with the sheet material extending thereunder or with the underlying table. A seal of this type is a relatively poor seal and leakage of the air or gas from within the cavity is the norm. To enhance the seal around the cavity in the platen, an O-ring disposed in a groove in the platen has been used. Such an O-ring provides a better seal but the O-ring may easily become damaged due to creep upon application of pressure within the cavity. The integrity of the O-ring may also be compromised by wear upon the O-ring due to lateral movement of the platen relative to the underlying table or sheet material. While an O-ring is relatively inexpensive and easily replaceable, the lost downtime during replacement may be expensive because of the reduced production rate. As the sealing capability of the O-ring deteriorates, the pressures present within the cavity necessary to perform the hydroforming function may be inadequate to form properly the products. The resulting loss of products or shipment of defectively formed products may be costly in the short term and result in loss of business opportunities in the long term.

SUMMARY OF THE INVENTION

A platen for use in a blow down hydroforming process includes a cavity sized commensurate with the length and breadth of the sheet material to be formed in conformance with an underlying mold. A wall of low wear plastic material circumscribes the cavity to form an initial seal with the underlying table and about the cavity. An inflatable seal member is disposed in circumscribing relationship with the wall to form a pressure seal between the platen and the underlying table. A further wall of plastic material circumscribes the inflatable seal member. While the two walls provide a sealing function against escape of gas from within the cavity of the platen, they serve the primary function of preventing creep of the inflatable seal member and thereby prevent associated deterioration and destruction of the inflatable seal member.

It is therefore a primary object of the present invention to provide a pressurizable seal about a blow down cavity in a platen used in a hydroforming process.

Another object of the present invention is to provide a long lived inflatable seal member for use with a blow down platen of a hydroforming process.

Yet another object of the present invention is to provide sealing walls for preventing creep of an inflatable seal member.

Still another object of the present invention is to provide a blow down cavity in a platen used in a hydroforming process which accommodates use of various gases at temperatures other than ambient temperature.

A further object of the present invention is to provide a sealable blow down cavity for using gas pressure to form plastic sheet material in conformance with a mold.

A yet further object of the present invention is to provide a platen for using gases under pressure at elevated temperatures in a blow down hydroforming process to form thermoplastic sheet materials.

A still further object of the present invention is to provide a method for sealing the cavity in a platen used in a blow down hydroforming process.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates a perspective view of the cavity and seals formed in the undersurface of a platen;

FIG. 2 is a partial cross sectional view taken along lines 2—2, as shown in FIG. 1;

FIG. 3 is a partial cross sectional view illustrating placement of a platen upon table supported sheet material to be formed; and FIG. 4 is a partial cross sectional view illustrating a product formed in response to pressure within a blow down cavity of a platen used in a hydroforming process.

DESCRIPTION OF THE PREFERRED EMBODIMENT

Referring to FIG. 1, there is illustrated a platen 10 having a centrally located cavity 12; this cavity includes an inlet 14 disposed in top surface 16. The inlet is in fluid communication with a source of air or gas, such as nitrogen, under pressure. The pressure source is capable of providing a pressure of approximately 4000 psi; however, depending upon the nature of the material to be formed and the configuration of the mold for forming the material, the pressure may be less than 4000 psi or it may be significantly greater, such as 8000 psi or more. Cavity 12 is defined by top surface 16 and a surrounding wall 18 depending from the top surface. A wall member 20 of low wear plastic material, such as the material sold under the trademark DELRON, is located laterally adjacent wall 18. A further wall member 22 is laterally displaced from wall member 20 to define a space therebetween. Wall member 22 is also of low wear plastic material, such as that sold under the trademark DELRON. An inflatable seal member 24 is disposed in the space intermediate wall members 20 and 22. This inflatable seal member serves as a sealing element or seal in cooperation with the work table to maintain the pressure within cavity 12 during exercise of a hydroforming process. An exterior wall 26 defines the perimeter of platen 10. Wall member 20 preferably extends somewhat below bottom surface 28 of platen 10. With such positioning, the wall member will serve a sealing function upon contact with the underlying table or sheet material to be formed, which sheet material may be adjacent the table. Similarly, wall member 22 extends somewhat below bottom surface 28 for the same reasons.

Referring to FIG. 2, further details of platen 10 will be described. A source 30 of gas, such as air, nitrogen, etc. provides gas under pressure to inlet 14, as representatively illustrated by arrow 32. A heater 34 may be employed to heat the gas flowing from source 30 to inlet 14, as representatively illustrated by line 36. Alternatively, the heater may heat the gas prior to pressurization of the gas. A valve 38 regulates the flow of gas under pressure into and out of cavity 12.

Inflatable seal member 24 is disposed intermediate wall members 20 and 22. It includes a compartment 40 extending therealong for receiving hydraulic fluid under pressure. The hydraulic fluid is provided by a source 42 of hydraulic fluid under pressure. A valve 44 controls flow of hydraulic fluid through conduit 46 into a further conduit 48 disposed in platen 10, as representatively depicted by arrow 50. Conduit 48 is in fluid communication with compartment 40 through a slot, a plurality of slots or one or more passageways 52 in fluid communication with the cavity. Valve 44, or an equivalent flow regulating mechanism, may be used to provide pressure relief for compartment 40 to depressurize the cavity.

Inflatable seal member 24 serves the purpose of forming a seal about the perimeter of cavity 12 in platen 10 to maintain the pressure within the cavity during the molding process. The inflatable seal member is of resilient flexible material to accommodate stretchability and elongation without damage to provide conformance with the surface against which a seal is to be made. Such surface may be the underlying table or the sheet material to be molded which lies upon such table. The force necessary for urging the inflatable seal member into sealing contact with the underlying surface is provided by source 42 of hydraulic fluid under pressure. The pressure within compartment 40 may range from a few hundred psi to more than 10,000 psi.

At the higher range of pressures, there is a great likelihood of oil seepage from compartment 40 between side walls 60 and 62 of inflatable seal member 24 and wall members 20 and 22 and on to the underlying table or the sheet material to be molded. Such seepage, if present, would contaminate the molded or formed sheet material and require subsequent cleaning. Since the cost for forming each sheet material is relatively modest, the additional costs associated with subsequent cleaning would create an unacceptable manufacturing cost increase. Furthermore, certain types of sheet material and products formed therefrom are not meant to be cleaned or they must not be contaminated due to an immediate subsequent manufacturing operation. To seal the inner and outer perimeters of inflatable seal member 24 and to prevent migration of the working surface of the inflatable seal member, wall members 20 and 22 are disposed on opposed sides. The material of the wall members is of harder and less compressible material than that of the inflatable seal member. Interface 64 between wall member 20 and the inflatable seal member and interface 66 between wall member 22 and the inflatable seal member is mutually conforming to eliminate any voids or passageways therethrough. Such effective seal may be formed by casting the inflatable seal member in the channel defined by wall members 20 and 22. Compartment 40 is formed within the inflatable seal member by a lost wax process, as is well known in the hydroforming art.

The pressure within compartment 40 and acting laterally against wall members 20 and 22 forces the material of the inflatable seal member into absolute conformance with the corresponding surfaces of the wall members, as defined by interfaces 64 and 66. Thereby, any seepage of oil or other hydraulic fluid intermediate inflatable seal member 24 and wall members 20 and 22 is precluded.

To minimize flow of a hydraulic fluid intermediate surface 68 of platen 10 and the inflatable sealing member, feet 70 and 72 extend inwardly from and in inscribing relationship with the interior perimeter of the inflatable seal member. The pressure within compartment 40 will bear against the interiorly exposed surfaces of feet 70 and 72 to urge the feet against surface 68 of platen 10. Any perturbations or discontinuities in surface 68 will be filled by the material forming feet 70, 72 during the pouring operation of the inflatable seal member; thereby, the existence of any voids or channels at the junction between feet 70 and 72 and surface 68 are minimized. As a further precaution, an adhesive, mastic or chemical surface preparation, may be employed to secure feet 70 and 72 to surface 68.

Referring to FIG. 3, there is shown the configuration of the apparatus in preparation for performing a blow down hydroforming process with platen 10. Table 80 supports a mold 82. This mold may be sized in general conformance with the perimeter of cavity 12 in platen 10. Alternatively, as illustrated, a planar surface of the mold may extend laterally past wall member 22. Sheet material 84 to be formed in conformance with mold 82 is placed upon the mold in registration therewith. As is usual, pins extending from the mold may cooperate with precisely located apertures in the sheet material to obtain registration between the sheet material and the mold. Other registration devices may also be employed. After mounting mold 82 upon table 80, sheet material 84 is placed upon the mold. Platen 10 and table 80 are brought together in the conventional manner used in hydroforming processes, as represented by arrow 86. As discussed above, wall members 20 and 22 extend somewhat below bottom surface 28 of platen 10 to urge these wall members into initial sealing engagement with the table directly or with sheet material 84 placed upon mold 82, as illustrated. Such contact under pressure will establish a preliminary seal. The primary purpose of the resulting concentric seals disposed on opposed sides of inflatable seal member 24 is that of constraining lateral creep of the inflatable seal member during pressurization and depressurization of the inflatable seal member. Thereby, deterioration of the inflatable seal member which would result were creep present will be prevented. While wall members 20 and 22 provide a sealing function to assist in maintaining the pressure within cavity 12, this benefit is primarily a secondary benefit.

After wall members 20 and 22 are brought into sealed engagement with the underlying surface by bringing platen 10 and table 80 together, valve 44 (see FIG. 2) is opened to permit flow of hydraulic fluid from source 40 of hydraulic fluid under pressure into compartment 40, as representatively depicted by arrow 50 and arrows 90 and 92. The resulting pressure rise within compartment 40 will cause downward movement of diaphragm portion 94 of the inflatable seal member into tight sealing engagement with the adjacent surface; this surface is sheet material 84, as depicted in FIG. 3 but may be table 80. The resulting seal will prevent leakage from within cavity 12 intermediate platen 10 and table 80. As discussed above, the sealing engagement of wall members. 20 and 22 will prevent lateral creep of the material of inflatable seal member 24 and deterioration due to creep will be avoided.

After a perimeter seal about cavity 12 has been established by inflatable seal member 24, cavity 12 is pressurized by actuating valve 38 depicted in FIG. 2. Gas from source of gas 30 is conveyed, as depicted by arrow 32, through inlet 14 into cavity 12. The resulting pressure rise within cavity 12 will act upon sheet material 84 to force it downwardly into conformance with the configuration of mold 82 disposed adjacent therewith.

Depending upon a number of variables, including the thickness of sheet material 84, its thermoplastic properties and the nature of the protrusions and indentations in mold 82, conformance of the sheet material with the mold may be enhanced by raising above ambient the temperature of the sheet material. Through use of heater 34 (see FIG. 2), the gas injected through inlet 14 may be heated to a predetermined temperature or to a temperature within a predetermined range. The selection of such temperature or temperature range is primarily a function of the properties of the sheet material to be formed to enhance uniform conformance with the mold. The heated gas within cavity 12 will transfer heat to sheet material 84 and the latter will become more compliant with the underlying mold.

Theoretical analysis, supported by experience and certain experimentation, suggests that a pressure within cavity 12 on the order of 4000 psi will be adequate to force conformation of the sheet material to be molded with an underlying mold within a relatively short time interval. However, with the addition of heat to render the sheet material more malleable or formable, the pressure may be reduced. For certain sheet materials and/or mold configurations, higher pressures, with or without heating of the gas, may be entertained. To ensure an adequate and sufficiently leak free seal circumscribing cavity 12 between platen 10 and the underlying surface (table 80), it has been found that the pressure within inflatable seal member 24 should be approximately 25% greater than the pressure present within cavity 12 of platen 10.

Hydraulic pumps and the like are presently available which can readily provide a pressure within the inflatable seal member on the order of 10,000 psi. Accordingly, the pressure within cavity 12 could be raised to 8,000 psi while still maintaining a 25% pressure differential present at the inflatable seal member.

After sheet material 84 has been formed, valve 38, or other valve means, is actuated to relive the pressure within cavity 12 by either venting the gas if it is air, or by channeling the gas into a suitable tank. Alternatively, a pump may be employed to withdraw the gas within cavity 12 to reduce the pressure therein to approximately atmospheric pressure. Commensurate with or subsequent to reduction of pressure within cavity 12, the pressure within inflatable seal member 24 is relieved by venting it to a tank or by pumping it out with a suitable pump. After the pressures within cavity 12 and inflatable seal member 24 have been relieved or brought to approximately atmospheric pressure, platen 10 and table 80 are separated to permit withdrawal of formed sheet material 84. After withdrawal, the sheet material is replaced with further sheet material to be formed. The replaced sheet material is acted upon as depicted in FIGS. 2 and 3 and as described above to repeat the cycle of molding the sheet material into conformance with the underlying mold.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

What is claimed is:

1. A blow down method for hydroforming sheet material within a cavity in a platen in conformance with a mold supported upon a table upon juxtapositioning of the platen with the table, said method comprises the steps of:
    a) supporting the sheet material upon the mold;
    b) establishing a gaseous pressure environment within the cavity adjacent the sheet material to force conformance of the sheet material with the mold;
    c) sealing the cavity with a circumscribing seal extending between the platen and the table upon exercise of said step of establishing to maintain the pressure in the cavity; and
    d) containing the seal between a pair of concentric wall members circumscribing the cavity, which concentric wall members extend downwardly from the platen toward the table, including the step of sealing the wall members against the table or sheet material upon juxtapositioning of the platen with the table to protect the seal by preventing migration of the seal toward and away from the cavity.

2. A method for hydroforming sheet material, said method comprising the steps of:
    (a) placing the sheet material across a mold mounted upon a table;
    (b) positioning a platen adjacent the table to locate a cavity within the platen in superimposed relationship with the mold and adjacent the sheet material;
    (c) creating a gaseous pressure environment within the cavity to act upon the sheet material and to urge conformance of the sheet material with the mold;
    (d) establishing a seal between the table and the platen in circumscribing relationship with the cavity to maintain the pressure environment within the cavity; and
    (e) containing the seal between a pair of concentric wall members extending downwardly from the platen and toward the table, said step of containing including the step of sealing the pair of concentric wall members against the table or sheet material upon exercise of said step of positioning.

3. The method as set forth in claim 2 including the step of injecting a gas into the cavity to create the pressure environment.

4. The method as set forth in claim 3 including the step of heating the gas injected into the environment to enhance conformance of the sheet material with the mold.

5. The method as set forth in claim 2 including the step of maintaining the pressure environment at a temperature above ambient temperature.

6. The method as set forth in claim 2 including the step of pressurizing the seal to enhance its sealing capability.

7. The method as set forth in claim 6 wherein said pressurizing step includes the step of injecting hydraulic fluid under pressure into the seal.

8. A method for hydroforming sheet material, said method comprising the steps of:

(a) placing sheet material upon a table mounted mold;

(b) applying a gaseous medium under pressure to the sheet material to urge conformance of the sheet material with the mold by pressurizing a cavity disposed in a platen adjacent the sheet material;

(c) providing a seal about the cavity between the table and the platen; and (d) containing the seal intermediate a pair of concentric wall members, each of which wall members extend between and in contact with the table and the platen on opposed sides of the seal to prevent migration of the seal.

9. The method as set forth in claim 8 including the step of pressurizing the seal.

10. The method as set forth in claim 9 wherein the pressurizing step includes the step of injecting hydraulic fluid into the seal.

* * * * *